United States Patent
Salehi et al.

(10) Patent No.: US 11,904,899 B2
(45) Date of Patent: Feb. 20, 2024

(54) LIMP HOME MODE FOR AN AUTONOMOUS VEHICLE USING A SECONDARY AUTONOMOUS SENSOR SYSTEM

(71) Applicant: GM Global Technology Operations LLC, Detroit, MI (US)

(72) Inventors: Rasoul Salehi, Ann Arbor, MI (US); Arun Adiththan, Sterling Heights, MI (US); Yao Hu, Sterling Heights, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 17/469,409

(22) Filed: Sep. 8, 2021

(65) Prior Publication Data

US 2023/0073065 A1 Mar. 9, 2023

(51) Int. Cl.
*B60W 50/023* (2012.01)
*B60W 60/00* (2020.01)
(Continued)

(52) U.S. Cl.
CPC .... *B60W 60/00186* (2020.02); *B60W 50/023* (2013.01); *B60W 50/0205* (2013.01); *B60W 50/029* (2013.01); *B60W 50/0225* (2013.01); *B60W 2050/0215* (2013.01); *B60W 2050/0292* (2013.01); *B60W 2420/42* (2013.01); *B60W 2420/52* (2013.01); *B60W 2552/05* (2020.02);
(Continued)

(58) Field of Classification Search
CPC ....... B60W 60/00186; B60W 50/0205; B60W 50/023; B60W 50/029; B60W 50/0225; B60W 2556/50; B60W 2556/60; B60W 2552/05; B60W 2050/0215; B60W 2050/292; B60W 2420/42; B60W 2420/52; B60W 2720/10
See application file for complete search history.

(56) References Cited

U.S. PATENT DOCUMENTS

11,173,829 B1 * 11/2021 Boecker .............. F21S 43/26
2018/0050685 A1 * 2/2018 Atluri ................. B60W 10/02
(Continued)

*Primary Examiner* — Peter D Nolan
*Assistant Examiner* — Wae L Louie
(74) *Attorney, Agent, or Firm* — Vivacqua Crane PLLC (57) ABSTRACT

An autonomous driving system for an autonomous vehicle includes a plurality of on-board autonomous sensors that sense data related to operation of the autonomous vehicle and a surrounding environment and an automated driving controller in electronic communication with the plurality of on-board autonomous sensors. The automated driving controller is instructed to receive an indication one or more of the plurality of on-board autonomous sensors are non-functional and a secondary autonomous sensor system including one or more replacement sensors are installed. The automated driving controller is instructed to verify the secondary autonomous sensor system based on a security check and perform a redundancy check between the one or more replacement sensors and the plurality of on-board autonomous sensors. In response to determining the one or more replacement sensors are valid based on the redundancy check, the automated driving controller operates the autonomous vehicle in a limp home mode.

20 Claims, 5 Drawing Sheets

(51) Int. Cl.
  *B60W 50/029*    (2012.01)
  *B60W 50/02*    (2012.01)
(52) U.S. Cl.
  CPC ..... *B60W 2556/50* (2020.02); *B60W 2556/60* (2020.02); *B60W 2720/10* (2013.01)

(56)　　　　　References Cited

U.S. PATENT DOCUMENTS

| | | | | |
|---|---|---|---|---|
| 2018/0276910 | A1* | 9/2018 | Pitt | G01B 11/14 |
| 2020/0339151 | A1* | 10/2020 | Batts | B60W 60/001 |
| 2021/0046952 | A1* | 2/2021 | Ju | B60W 50/029 |
| 2021/0253128 | A1* | 8/2021 | Nister | G06N 7/01 |
| 2022/0281468 | A1* | 9/2022 | Pandy | B60W 50/035 |
| 2023/0022820 | A1* | 1/2023 | Ogino | B60T 8/17558 |
| 2023/0132179 | A1* | 4/2023 | Salehi | B60W 60/0025 |
| | | | | 701/24 |
| 2023/0161029 | A1* | 5/2023 | Giddens | G01S 13/931 |
| | | | | 342/54 |

\* cited by examiner

LIMP HOME MODE FOR AN AUTONOMOUS VEHICLE USING A SECONDARY AUTONOMOUS SENSOR SYSTEM

INTRODUCTION

The present disclosure relates to an autonomous vehicle employing a secondary autonomous sensor system. More particularly, the present disclosure relates to an autonomous vehicle operating in a limp home mode that limits one or more autonomous drive features of the autonomous vehicle when the secondary autonomous sensor system is employed.

An autonomous vehicle may drive from a starting point to a predetermined destination with limited or no human intervention using various in-vehicle technologies and sensors. Autonomous vehicles include a variety of autonomous sensors such as, but not limited to, cameras, sonic sensors, radar, LiDAR, global positioning systems (GPS), and inertial measurement units (IMU) for detecting a vehicle's exterior surroundings and status. An onboard controller of the vehicle determines an appropriate driving route based on a destination entered by user in combination with the information gathered by the various autonomous sensors.

If one or more autonomous sensors become non-functional, or if there are certain faults that occur within the vehicle's hardware, then the autonomous system may no longer be able to guide the vehicle to the destination indicated by the vehicle's user. It is to be appreciated that although the autonomous system is no longer able to function, other components such as the steering wheel or the powertrain of the autonomous vehicle may still operate. In other words, the motor and drivetrain components that propel the autonomous vehicle still function, however, the systems governing autonomous operation are unable to guide the vehicle. In one approach, redundant autonomous sensors may be included to alleviate this issue, however, redundant components introduce significant cost to the autonomous vehicle.

Thus, while current autonomous vehicles achieve their intended purpose, there is a need in the art for an improved system that allows an autonomous vehicle to continue to drive once one or more autonomous sensors are non-functional.

SUMMARY

According to several aspects, an autonomous driving system for an autonomous vehicle is disclosed. The autonomous driving system includes a plurality of on-board autonomous sensors that sense data related to operation of the autonomous vehicle and a surrounding environment and an automated driving controller in electronic communication with the plurality of on-board autonomous sensors. The automated driving controller is instructed to receive an indication one or more of the plurality of on-board autonomous sensors are non-functional and a secondary autonomous sensor system including one or more replacement sensors are installed upon the autonomous vehicle. The automated driving controller is instructed to verify the secondary autonomous sensor system based on a security check. The automated driving controller is further instructed to perform a redundancy check between the one or more replacement sensors and the plurality of on-board autonomous sensors. The automated driving controller determines data received from the one or more replacement sensors are valid based on the redundancy check. Finally, in response to determining the one or more replacement sensors are valid based on the redundancy check, the automated driving controller operates the autonomous vehicle in a limp home mode.

In one aspect, the limp home mode limits one or more autonomous driving features of the autonomous vehicle.

In another aspect, the one or more autonomous driving features include at least one of the following: a speed of the autonomous vehicle, specific roadways that the autonomous vehicle is allowed to travel upon, a predetermined destination, and specific driving maneuvers.

In yet another aspect, the autonomous driving system further includes a receptacle electronically connected to a corresponding plug of the secondary autonomous sensor system.

In still another aspect, the plurality of on-board autonomous sensors includes one or more of the following: one or more cameras, a radar, an inertial measurement unit (IMU), a global positioning system (GPS), and LiDAR.

In one aspect, the automated driving controller is instructed to determine an updated predetermined destination that is different from an original predetermined destination entered by a user of the autonomous vehicle.

In another aspect, the updated predetermined destination is a repair facility.

In yet another aspect, the security check indicates a correct number and type of replacement sensors are connected to the automated driving controller.

In still another aspect, the automated driving controller is instructed to: in response to determining the secondary autonomous sensor system has passed the security check, perform a data synchronization that determines missing sensor data required by the automated driving controller.

In one aspect, the data synchronization further includes synchronizing time and position between the automated driving controller and a secondary controller of the secondary autonomous sensor system.

In another aspect, the redundancy check includes calculating an error between the one or more replacement sensors of the secondary autonomous sensor system and the plurality of on-board autonomous sensors that are still functional on the autonomous vehicle.

In yet another aspect, the data collected by the one or more replacement sensors of the secondary autonomous sensor system is integrated with data collected by the plurality of on-board autonomous sensors based on a parallel approach, a centralized approach, or a hybrid approach.

In still another aspect, the parallel approach involves a secondary controller of the secondary autonomous sensor system and the automated driving controller executing separate perception algorithms independently from one another and then merging results together.

In one aspect, the centralized approach involves a secondary controller of the secondary autonomous sensor system sending raw data generated by the one or more replacement sensors directly to the automated driving controller.

In another aspect, the automated driving controller executes perception algorithms based on the raw data generated by the one or more replacement sensors.

In yet another aspect, the hybrid approach involves a secondary controller secondary controller of the secondary autonomous sensor system and the automated driving controller sharing data with one another while executing perception algorithms and then merging results together.

In an aspect, an autonomous driving system for an autonomous vehicle is disclosed and includes a plurality of on-board autonomous sensors that sense data related to operation of the autonomous vehicle and a surrounding environment and an automated driving controller in electronic communication with the plurality of on-board autonomous sensors. The automated driving controller is instructed to receive an indication one or more of the plurality of on-board autonomous sensors are non-functional and a secondary autonomous sensor system including one or more replacement sensors are installed upon the autonomous vehicle. The automated driving controller is instructed to verify the secondary autonomous sensor system based on a security check, wherein the security check indicates a correct number and type of replacement sensors are connected to the automated driving controller. In response to determining the secondary autonomous sensor system has passed the security check, the automated driving controller performs a data synchronization that determines missing sensor data required by the automated driving controller. The automated driving controller is instructed to perform a redundancy check between the one or more replacement sensors and the plurality of on-board autonomous, where the redundancy check includes calculating an error between the one or more replacement sensors of the secondary autonomous sensor system and the plurality of on-board autonomous sensors that are still functional on the autonomous vehicle. The automated driving controller determine data received from the one or more replacement sensors are valid based on the redundancy check. Finally, in response to determining the one or more replacement sensors are valid based on the redundancy check, the automated driving controller operates the autonomous vehicle in a limp home mode, wherein the limp home mode limits one or more autonomous driving features.

In one aspect, the one or more autonomous driving features include at least one of the following: a speed of the autonomous vehicle, specific roadways that the autonomous vehicle is allowed to travel upon, a predetermined destination, and specific driving maneuvers.

In another aspect, the autonomous driving system further comprises a receptacle electronically connected to a corresponding plug of the secondary autonomous sensor system.

In yet another aspect, a non-transitory computer readable storage medium readable by a processing circuit and storing instructions that when executed by the processing circuit perform method operations is disclosed. The method includes receiving an indication one or more of a plurality of on-board autonomous sensors are non-functional and a secondary autonomous sensor system including one or more replacement sensors are installed upon an autonomous vehicle. The method also includes verifying the secondary autonomous sensor system based on a security check, where the security check indicates a correct number and type of replacement sensors are connected to an automated driving controller. In response to determining the secondary autonomous sensor system has passed the security check, the method includes performing a data synchronization that determines missing sensor data required by the automated driving controller. The method also includes performing a redundancy check between the one or more replacement sensors and the plurality of on-board autonomous sensors. The method includes determining data received from the one or more replacement sensors are valid based on the redundancy check. In response to determining the one or more replacement sensors are valid based on the redundancy check, the method includes operating the autonomous vehicle in a limp home mode, where the limp home mode limits one or more autonomous driving features Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
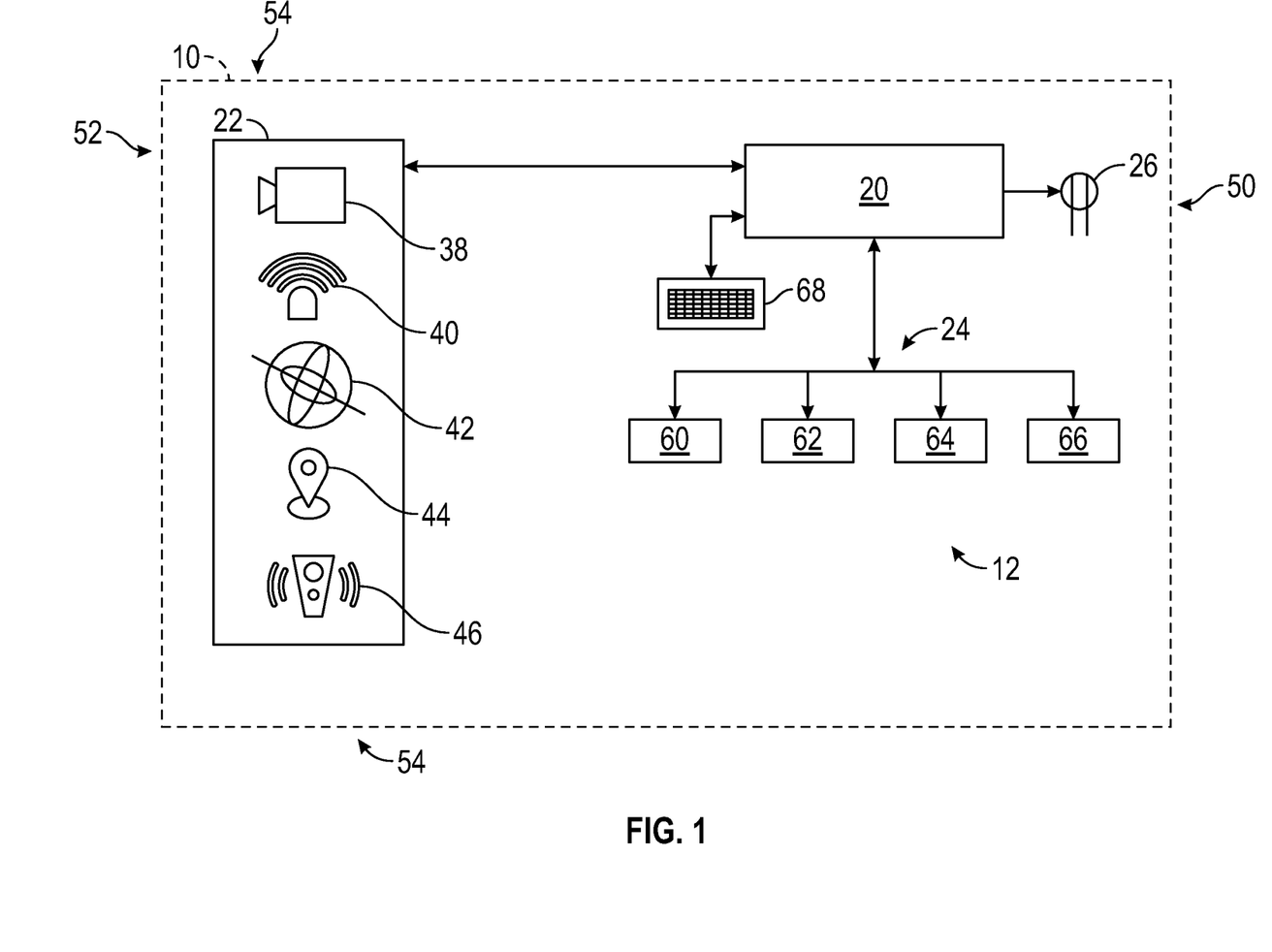
FIG. 1 is a schematic diagram of an autonomous vehicle including an automated driving controller, a plurality of on-board autonomous sensors, and a receptacle for receiving a secondary autonomous sensor system, according to an exemplary embodiment.

Referring to FIG. 1, an exemplary autonomous vehicle 10 is illustrated. The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The autonomous vehicle 10 has an autonomous driving system 12 that includes an automated driving controller 20. The automated driving controller 20 is in electronic communication with a plurality of on-board autonomous sensors 22, a plurality of vehicle systems 24, and a receptacle 26. The receptacle 26 electronically connects to corresponding plug 74 of a secondary autonomous sensor system 30 (shown in FIG. 2).

As explained below, the secondary autonomous sensor system 30 includes one or more replacement sensors 32 (FIG. 2) for recovering autonomous drive capability of the autonomous vehicle 10 in the event one or more of the on-board autonomous sensors 22 no longer function and are unable to send accurate data to the automated driving controller 20. As also explained below, when the secondary autonomous sensor system 30 is employed, the autonomous vehicle 10 operates in a limp home mode. The limp home mode may limit one or more autonomous drive features of the autonomous vehicle 10 until a vehicle owner visits a repair facility.

The automated driving controller 20 determines autonomous driving features such as perception, planning, localization, mapping, and control of the autonomous vehicle 10. Although FIG. 1 illustrates the automated driving controller 20 as a single controller, it is to be appreciated that multiple controllers may be included as well. In the example as shown in FIG. 1, the plurality of on-board autonomous sensors 22 include one or more cameras 38, a radar 40, an inertial measurement unit (IMU) 42, a global positioning system (GPS) 44, and LiDAR 46, however, it is to be appreciated that additional sensors may be used as well.

The plurality of on-board autonomous sensors 22 sense data related to operation of the autonomous vehicle 10 and a surrounding environment, which is sent to the automated driving controller 20. Specifically, the cameras 38 each detect static and dynamic obstacles within a respective field-of-view (FOV). Some examples of static and dynamic obstacles include other vehicles, pedestrians, road signs, traffic lights, road lane markings, and barriers. In an embodiment, cameras 38 may be located at a front side 50, a rear side 52, and both opposing sides 54 of the autonomous vehicle 10, where the multiple images captured by each camera 38 are stitched together to create a 360-degree view of the surrounding environment. Both the radar 40 and the LiDAR 46 may be used to detect objects and a distance associated with the object, as well as to determine the objects' speed and disposition, however, LiDAR may be used to detect relatively smaller objects, while radar may be used in limited visibility conditions such as cloudy or foggy weather. Both the IMU 42 and the GPS 44 may be used to directly measure vehicle state. Specifically, the IMU 44 may be used to determine an angular rotation rate, acceleration, and heading, and the GPS 44 may be used to determine position, velocity, and time.

The plurality of vehicle systems 24 include, but are not limited to, a brake system 60, a steering system 62, a powertrain system 64, and a suspension system 66. The automated driving controller 20 sends vehicle control commands to the plurality of vehicle systems 24, thereby guiding the autonomous vehicle 10 to a predetermined destination. For example, a user of the autonomous vehicle 10 may enter the predetermined destination using an input device 68 that is in electronic communication with the automated driving controller 20. In one embodiment, the input device 68 may be a keyboard.

Figure 2:
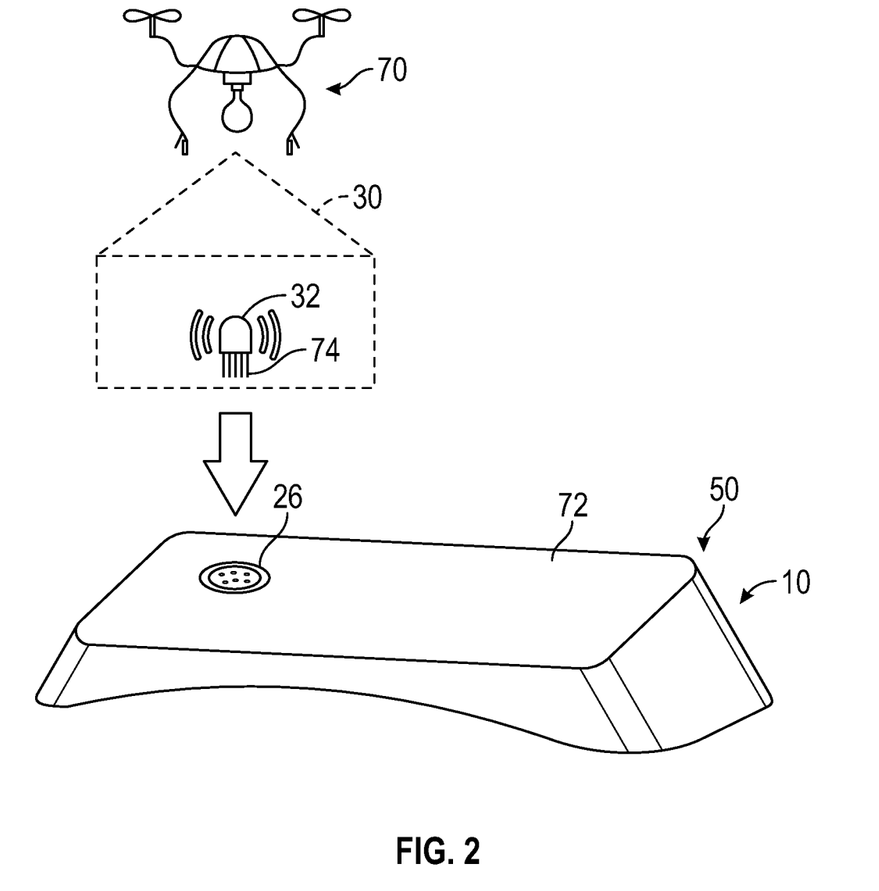
FIG. 2 is a schematic diagram of the secondary autonomous sensor system that connects to the receptacle of the autonomous vehicle, according to an exemplary embodiment.

FIG. 2 is an illustration of the secondary autonomous sensor system 30 being transported to the autonomous vehicle 10 by an unmanned aerial vehicle (UAV) 70. It is to be appreciated that one or more of the on-board autonomous sensors 22 (seen in FIG. 1) that are part of the autonomous vehicle 10 are non-functional. However, it is also to be appreciated that not all of the on-board autonomous sensors 22 are non-functional. Since one or more of the on-board autonomous sensors 22 are non-functional, the one or more replacement sensors 32 provide replacement data for recovering the autonomous drive capability of the autonomous vehicle 10. For example, if one of the cameras 38 that are part of the plurality of on-board autonomous sensors 22 (FIG. 1) break, then the replacement sensor 32 provides vision data. Although FIG. 2 illustrates the secondary autonomous sensor system 30 being transported by the UAV 70, it is to be appreciated that FIG. 2 is merely exemplary in nature. Indeed, the secondary autonomous sensor system 30 may be transported to the autonomous vehicle 10 using other approaches as well. For example, in another embodiment, the secondary autonomous sensor system 30 is transported by an automobile.

The secondary autonomous sensor system 30 includes the plug 74 that electrically connects to the receptacle 26 of the autonomous vehicle 10. Accordingly, data may be shared between the automated driving controller 20 (seen in FIG. 1) of the autonomous vehicle 10 and a secondary controller 80 (seen in FIG. 3) of the secondary autonomous sensor system 30. In the example as shown in FIG. 2, the receptacle 26 is located along a roof 72 of the autonomous vehicle 10, however, it is to be appreciated that FIG. 2 is merely exemplary in nature. The receptacle 26 may be located in any area of the autonomous vehicle 10 that provides the visibility that the one or more replacement sensors 32 requires. For example, if the replacement sensor 32 is a camera 38 that captures data along the front side 50 of the autonomous vehicle 10, then the receptacle 26 may be located along a front grille of the autonomous vehicle 10. Moreover, in some embodiments, the receptacle 26 may be located within the interior cabin of the autonomous vehicle 10.

Figure 3:
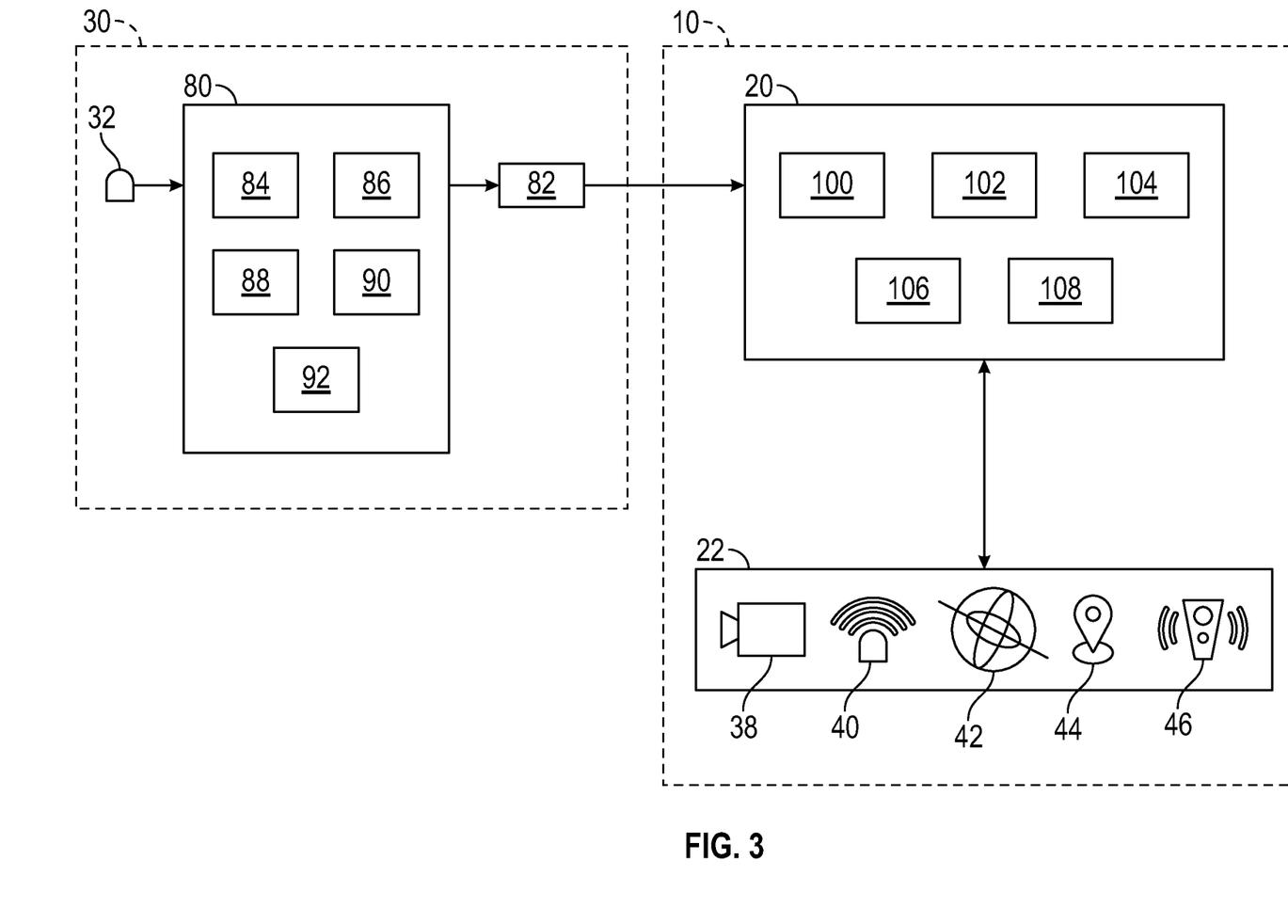
FIG. 3 is a schematic illustration of the automated driving controller of the autonomous vehicle in electronic communication with a secondary controller of the secondary autonomous sensor system, according to an exemplary embodiment.

FIG. 3 is a schematic diagram illustrating the one or more replacement sensors 32 of the secondary autonomous sensor system 30 in electronic communication with the automated driving controller 20 of the autonomous vehicle 10. The secondary autonomous sensor system 30 includes the secondary controller 80 and communication hardware and software 82 that electronically connects the secondary controller 80 to the automated driving controller 20 of the autonomous vehicle 10. The secondary controller 80 is in electronic communication with the one or more replacement sensors 32. In one embodiment, the secondary controller 80 includes a security module 84, a synchronization module 86, a perception module 88, a localization module 90, and a self-diagnostic module 92.

Continuing to refer to FIG. 3, the automated driving controller 20 includes a security module 100, a synchronization module 102, a perception module 104, a localization module 106, and a diagnostic module 108. The automated driving controller 20 receives an indication that one or more of the plurality of on-board autonomous sensors 22 are non-functional and the secondary autonomous sensor system 30 including the one or more replacement sensors 32 are installed upon the autonomous vehicle 10 to restore autonomous driving capability.

Once the secondary autonomous sensor system 30 has been installed and powered on, the secondary autonomous sensor system 30 is verified by a security check executed by the automated driving controller 20 of the autonomous vehicle 10. Specifically, the security check that indicates a correct number and type of replacement sensors are connected to the automated driving controller 20 of the autonomous vehicle 10. The security check also ensures that the autonomous vehicle 10 is not connected to a fraudulent sensor set. For example, in one embodiment, both the security module 84 of the secondary controller 80 and the security module 100 of the automated driving controller 20 may receive individual security codes from a back office system. If the security codes match one another, this ensures the autonomous vehicle 10 has not received a fraudulent sensor set. If the secondary autonomous sensor system 30 does not pass the security check, then the security check may be repeated or, in the alternative, corrective action may be taken.

In response to determining the secondary autonomous sensor system 30 has passed the security check, the secondary controller 80 of the secondary autonomous sensor system 30 and the automated driving controller 20 then perform data synchronization. The data synchronization determines missing sensor data required by the automated driving controller 20. That is, the data synchronization determines which on-board autonomous sensor 22 of the autonomous vehicle 10 is non-functional, and then instructs the secondary controller 80 to send the missing sensor data that would otherwise be collected by the non-functional on-board autonomous sensor 22. For example, if the IMU 42 is non-functional, then the synchronization module 102 of the automated driving controller 20 of the autonomous vehicle 10 sends a message indicating IMU data is required from the synchronization module 86 of the secondary controller 80 of the secondary autonomous sensor system 30. Additionally, the data synchronization also confirms a format of the missing sensor data that is exchanged between the automated driving controller 20 and the secondary controller 80.

The data synchronization further includes synchronizing time and position between the automated driving controller 20 and the secondary controller 80. Specifically, the data synchronization includes synchronizing a clock included with the automated driving controller 20 of the autonomous vehicle 10 with a clock included with the secondary controller 80 of the secondary autonomous sensor system 30. For example, in one embodiment, synchronizing the clocks may involve using a global timer to ensure that both the clocks of the automated driving controller 20 and the secondary controller 80 produce identical timestamps. The synchronization module 86 of the secondary controller 80 determines reference coordinates relative to the receptacle 26, and the reference coordinates are sent to the synchronization module 102 of the automated driving controller 20.

Once the security check and the data synchronization are complete, the perception module 88 of the secondary controller 80 initiates environment perception tasks such as, for example, lane detection and object detection. The localization module 90 of the secondary controller 80 initiates measurement of the vehicle states and localizes the autonomous vehicle 10. In an embodiment, the perception module 88 sends a time stamp associated with the detected objects and a confidence level to the self-diagnostic module 92, and the localization module 90 sends feedback signals to the self-diagnostic module 92 of the secondary controller 80. The feedback signals represent feedback signals that are found in a closed loop algorithm. The self-diagnostic module 92 then executes a diagnostic algorithm to determine an accuracy of the data received from the perception module 88 and the localization module 90 of the secondary controller 80. If the self-diagnostic module 92 determines the data received from the perception module 88 and the localization module 90 meet a minimum level of accuracy, then the data is transmitted to the automated driving controller 20 of the autonomous vehicle 10.

In an embodiment, once the secondary autonomous sensor system 30 is installed upon the autonomous vehicle 10, the automated driving controller 20 of the autonomous vehicle 10 determines an updated predetermined destination that may be different from an original predetermined destination entered by a user of the autonomous vehicle 10. The updated predetermined destination may be, for example, a repair facility or a user's home. For example, if the predetermined destination that was originally selected by a user is his or her home or place of residence, then in one embodiment the updated predetermined location may be a repair facility.

The automated driving controller 20 also performs a redundancy check between the one or more replacement sensors 32 and the plurality of on-board autonomous sensors 22 once the secondary autonomous sensor system 30 is installed. The redundancy check confirms the data received from the one or more replacement sensors 32 is valid. Specifically, the data received from the one or more replacement sensors 32 is valid if the data does not include faults or inaccurate information. In the event the one or more replacement sensors 32 are unable to be validated, the secondary controller 80 of the secondary autonomous sensor system 30 may repeat the security check and the data synchronization.

The redundancy check is executed by the diagnostic module 108 of the automated driving controller 20 by calculating an error between the one or more replacement sensors 32 of the secondary autonomous sensor system 30 and the plurality of on-board autonomous sensors 22 that are still functional on the autonomous vehicle 10. The diagnostic module 108 of the automated driving controller 20 determines the one or more replacement sensors 32 are valid in response to determining the error falls within a predetermined margin. The predetermined margin ensures that the data collected by the one or more replacement sensors 32 collect data within an acceptable range. For example, an object is detected by the camera 38 of the autonomous vehicle 10 and the one or more replacement sensors 32 of the secondary autonomous sensor system 30, and the automated driving controller 20 and the secondary controller 80 both calculate the object's size, location, and distance. If the error between the object's size, location, and distance calculated by the automated driving controller 20 and the secondary controller 80 fall within the predetermined margin, then the camera 38 of the secondary autonomous sensor system 30 passes the redundancy check.

In response to determining the one or more replacement sensors 32 pass the redundancy check, the automated driving controller 20 operates in the limp home mode. The limp home mode limits one or more autonomous driving features of the autonomous vehicle 10. In an embodiment, the one or more autonomous driving features that are limited include a speed of the autonomous vehicle, specific roadways that the autonomous vehicle is allowed to travel upon, the predetermined destination, specific driving maneuvers, distance to other vehicles, and acceleration. For example, the speed of the autonomous vehicle 10 may be limited to a maximum speed, or the autonomous vehicle 10 may not be able to perform specific driving maneuvers such as driving on a high speed lane of a highway. In an embodiment, the automated driving controller 20 broadcasts a message to surrounding vehicles and objects indicating the autonomous vehicle 10 is operating in the limp home mode.

The secondary controller 80 operates continuously to transmit sensor data to the automated driving controller 20 of the autonomous vehicle 10 when operating in the limp home mode. The sensor data collected by the one or more replacement sensors 32 of the secondary autonomous sensor system 30 is integrated with the data collected by the plurality of on-board autonomous sensors 22 based on a parallel approach, a centralized approach, or a hybrid approach. The parallel approach involves the perception module 88 of the secondary controller 80 and the perception module 104 of the automated driving controller 20 executing separate perception algorithms independently from one another, and then merging the results together. The centralized approach involves the secondary controller 80 sending raw data generated by the one or more replacement sensors 32 directly to the perception module 104 of the automated driving controller 20. The perception module 104 of the automated driving controller 20 then executes the perception algorithms based on the raw data generated by the one or more replacement sensors 32. The hybrid approach involves the perception module 88 of the secondary controller 80 and the perception module 104 of the automated driving controller 20 sharing data with one another while executing perception algorithms, and then merging the results together. In an embodiment, the data integration approach (i.e., the parallel approach, the centralized approach, or the hybrid approach) is selected based on either a type of replacement sensor 32 and/or the results of validating the replacement sensor 32.

It is to be appreciated that the limp home mode includes its own planning and control algorithms. Specifically, based on set limitations and information of secondary sensor characteristics such as accuracy, a planning algorithm specific to the limp home mode calculates new path and maneuver decisions for autonomously driving the autonomous vehicle 10. Based on planned maneuvers, a new path, and the secondary sensor information, the automated driving controller 20 calculates actuator commands such as propulsion torque or steering angle in the limp home mode.

Figure 4:
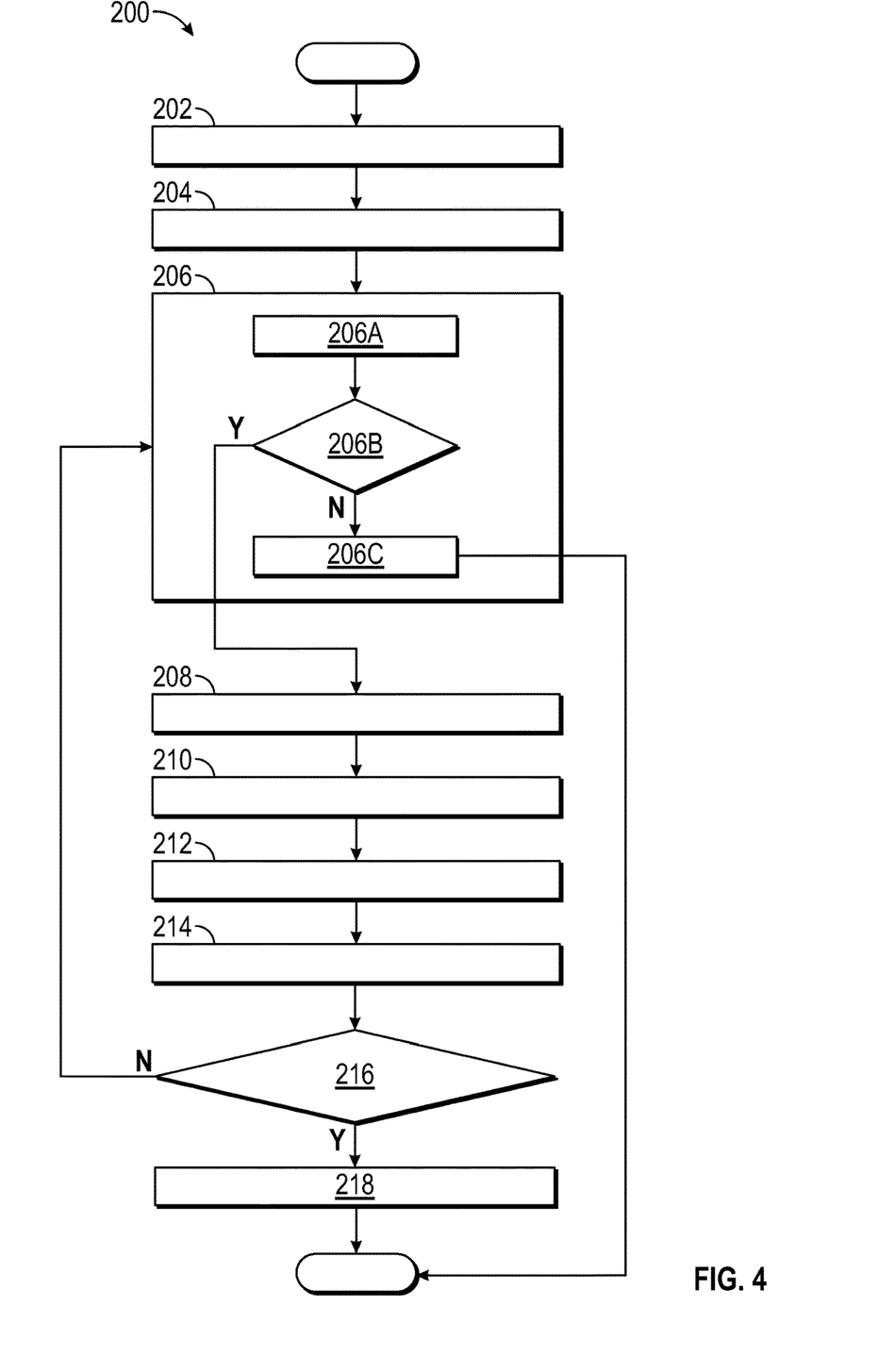
FIG. 4 is a process flow diagram illustrating a method for operating the autonomous vehicle in a limp home mode, according to an exemplary embodiment.

FIG. 4 is a process flow diagram illustrating a method 200 for operating the autonomous vehicle in the limp home mode. Referring to FIGS. 3 and 4, the method 200 may begin at block 202. In block 202, the secondary autonomous sensor system 30 is installed upon the autonomous vehicle 10. The method 200 may then proceed to block 204.

In block 204, the automated driving controller 20 of the autonomous vehicle 10 determines the updated predetermined destination. For example, in one embodiment, the updated predetermined destination is a repair facility. The method 200 may then proceed to block 206.

In block 206, the automated driving controller 20 performs the redundancy check between the one or more replacement sensors 32 and the plurality of on-board autonomous sensors 22 to confirm the data received from the one or more replacement sensors 32 is valid. Specifically, the method then proceeds to block 206A. In block 206A, the diagnostic module 108 of the automated driving controller 20 calculates the error between the one or more replacement sensors 32 of the secondary autonomous sensor system 30 and the plurality of autonomous sensors 22 that are still functional. The method 200 may then proceed to decision block 206B.

In decision block 206B, if the error does not fall within the predetermined margin, then the method 200 may proceed to block 206C, where the limp home mode is not initiated. The method 200 may then terminate, or corrective action may be taken.

Returning to decision block 206B, if the error falls within the predetermined margin, then the method 200 may then proceed to block 208.

In block 208, in response to determining the one or more replacement sensors 32 are valid based on the redundancy check, the automated driving controller 20 operates the autonomous vehicle in the limp home mode. As mentioned above, the limp home mode limits one or more autonomous driving features such as, for example, the speed of the autonomous vehicle, or the predetermined destination. The method 200 may then proceed to block 210.

In block 210, the new limitations for planning and control maneuvers are then set by the automated driving controller 20. Specifically, the limp home mode limits one or more autonomous driving features such as the speed of the autonomous vehicle 10 or specific driving maneuvers. The method 200 may then proceed to block 212.

In block 212, the automated driving controller 20 broadcasts a message to surrounding vehicles and objects indicating the autonomous vehicle 10 is operating in the limp home mode. The method 200 may then proceed to block 214.

In block 214, the secondary controller 80 operates continuously to transmit sensor data to the automated driving controller 20 of the autonomous vehicle 10 until the autonomous vehicle 10 reaches the updated predetermined destination. The method 200 may then proceed to block 216.

In decision block 216, if the autonomous vehicle 10 has not yet reached the updated predetermined destination, then the method 200 returns to block 206, and the redundancy check is performed again. However, if the autonomous vehicle 10 has reached the updated predetermined destination, then the method 200 proceeds to block 218, where the autonomous vehicle 10 is stopped. For example, the autonomous vehicle 10 may have arrived at a repair facility. The method 200 may then terminate.

Figure 5:
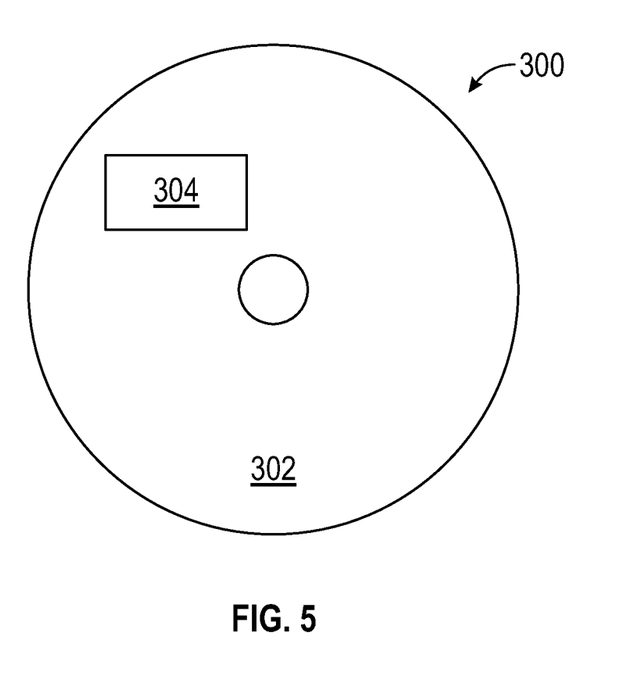
FIG. 5 illustrates a computer program product including one or more storage media, according to an exemplary embodiment.

Referring now to FIG. 5, a computer program product 300 includes one or more non-transitory computer readable storage mediums 302. The storage medium 602 stores computer readable program code or logic 304 thereon to provide and facilitate one or more aspects of embodiments described herein. The program code or logic is created using a compiler or assembler for example, to assemble instructions, that, when executed perform aspects of embodiments. The program code, when created and stored on a tangible medium, is referred to as a computer readable medium. Some examples of a computer readable medium include, but are not limited to, electronic memory modules (RAM), flash memory, and compact discs (CDs). The computer program product medium is readable by a processing circuit in a computer system for execution by a processing circuit.

Referring generally to the figures, the autonomous vehicle and secondary autonomous sensor system provides various technical effects and benefits. Specifically, the secondary autonomous sensor system provides an approach that allows for the autonomous vehicle to operate even when one or more on-board autonomous sensors are non-functional, without the need to provide redundant sensors that introduce significant costs. In contrast, current conventional autonomous vehicle systems require the vehicle to stop and be towed to a repair facility when one or more autonomous sensors become non-functional. Furthermore, the disclosed autonomous driving system provides a limp home mode that allows for the autonomous vehicle to operate with limited capabilities until the autonomous vehicle visits a repair facility.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An autonomous driving system for an autonomous vehicle, the autonomous driving system comprising:
    a plurality of on-board autonomous sensors that sense data related to operation of the autonomous vehicle and a surrounding environment;
    a receptacle; and
    an automated driving controller in electronic communication with the plurality of on-board autonomous sensors and the receptacle, wherein the receptacle electronically connects the automated driving controller to a corresponding plug of a secondary autonomous sensor system, and wherein the automated driving controller is instructed to:
        receive an indication one or more of the plurality of on-board autonomous sensors are non-functional and the secondary autonomous sensor system including one or more replacement sensors are installed upon the autonomous vehicle;
        verify the secondary autonomous sensor system based on a security check;
        perform a redundancy check between the one or more replacement sensors and the plurality of on-board autonomous sensors;
        determine data received from the one or more replacement sensors are valid based on the redundancy check; and
        in response to determining the one or more replacement sensors are valid based on the redundancy check, operate the autonomous vehicle in a limp home mode.

2. The autonomous driving system of claim 1, wherein the limp home mode limits one or more autonomous driving features of the autonomous vehicle.

3. The autonomous driving system of claim 2, wherein the one or more autonomous driving features include at least one of the following: a speed of the autonomous vehicle, specific roadways that the autonomous vehicle is allowed to travel upon, a predetermined destination, and specific driving maneuvers.

4. The autonomous driving system of claim 1, wherein the plurality of on-board autonomous sensors includes one or more of the following: one or more cameras, a radar, an inertial measurement unit (IMU), a global positioning system (GPS), and LiDAR.

5. The autonomous driving system of claim 1, wherein the automated driving controller is instructed to:
    determine an updated predetermined destination that is different from an original predetermined destination entered by a user of the autonomous vehicle.

6. The autonomous driving system of claim 5, wherein the updated predetermined destination is a repair facility.

7. The autonomous driving system of claim 1, wherein the security check indicates a correct number and type of replacement sensors are connected to the automated driving controller.

8. The autonomous driving system of claim 1, wherein the automated driving controller is instructed to:
    in response to determining the secondary autonomous sensor system has passed the security check, perform a data synchronization that determines missing sensor data required by the automated driving controller.

9. The autonomous driving system of claim 8, wherein the data synchronization further includes synchronizing time and position between the automated driving controller and a secondary controller of the secondary autonomous sensor system.

10. The autonomous driving system of claim 1, wherein the redundancy check includes calculating an error between the one or more replacement sensors of the secondary autonomous sensor system and the plurality of on-board autonomous sensors that are still functional on the autonomous vehicle.

11. The autonomous driving system of claim 1, wherein the data collected by the one or more replacement sensors of the secondary autonomous sensor system is integrated with data collected by the plurality of on-board autonomous sensors based on a parallel approach, a centralized approach, or a hybrid approach.

12. The autonomous driving system of claim 11, wherein the parallel approach involves a secondary controller of the secondary autonomous sensor system and the automated driving controller executing separate perception algorithms independently from one another and then merging results together.

13. The autonomous driving system of claim 11, wherein the centralized approach involves a secondary controller of the secondary autonomous sensor system sending raw data generated by the one or more replacement sensors directly to the automated driving controller.

14. The autonomous driving system of claim 13, wherein the automated driving controller executes perception algorithms based on the raw data generated by the one or more replacement sensors.

15. The autonomous driving system of claim 11, wherein the hybrid approach involves a secondary controller secondary controller of the secondary autonomous sensor system and the automated driving controller sharing data with one another while executing perception algorithms and then merging results together.

16. The autonomous driving system of claim 1, wherein the secondary autonomous sensor system is a stand-alone system that is installed upon the autonomous vehicle to restore autonomous driving capability.

17. An autonomous driving system for an autonomous vehicle, the autonomous driving system comprising:
    a plurality of on-board autonomous sensors that sense data related to operation of the autonomous vehicle and a surrounding environment;
    a receptacle; and
    an automated driving controller in electronic communication with the plurality of on-board autonomous sensors and the receptacle, wherein the receptacle electronically connects the automated driving controller to a corresponding plug of a secondary autonomous sensor system, and wherein the automated driving controller is instructed to:
        receive an indication one or more of the plurality of on-board autonomous sensors are non-functional and the secondary autonomous sensor system including one or more replacement sensors are installed upon the autonomous vehicle;
        verify the secondary autonomous sensor system based on a security check, wherein the security check indicates a correct number and type of replacement sensors are connected to the automated driving controller;
        in response to determining the secondary autonomous sensor system has passed the security check, perform a data synchronization that determines missing sensor data required by the automated driving controller;

perform a redundancy check between the one or more replacement sensors and the plurality of on-board autonomous sensors, wherein the redundancy check includes calculating an error between the one or more replacement sensors of the secondary autonomous sensor system and the plurality of on-board autonomous sensors that are still functional on the autonomous vehicle;

determine data received from the one or more replacement sensors are valid based on the redundancy check; and in response to determining the one or more replacement sensors are valid based on the redundancy check, operate the autonomous vehicle in a limp home mode, wherein the limp home mode limits one or more autonomous driving features.

18. The autonomous driving system of claim 17, wherein the one or more autonomous driving features include at least one of the following: a speed of the autonomous vehicle, specific roadways that the autonomous vehicle is allowed to travel upon, a predetermined destination, and specific driving maneuvers.

19. A non-transitory computer readable storage medium readable by a processing circuit and storing instructions that when executed by the processing circuit perform method operations, comprising:

receiving an indication one or more of a plurality of on-board autonomous sensors are non-functional and a secondary autonomous sensor system including one or more replacement sensors are installed upon an autonomous vehicle;

verifying the secondary autonomous sensor system based on a security check, wherein the security check indicates a correct number and type of replacement sensors are connected to an automated driving controller, wherein the automated driving controller is in electronic communication with a receptacle, and wherein the receptacle electronically connects the automated driving controller to a corresponding plug of the secondary autonomous sensor system;

in response to determining the secondary autonomous sensor system has passed the security check, performing a data synchronization that determines missing sensor data required by the automated driving controller;

performing a redundancy check between the one or more replacement sensors and the plurality of on-board autonomous sensors;

determining data received from the one or more replacement sensors are valid based on the redundancy check; and in response to determining the one or more replacement sensors are valid based on the redundancy check, operating the autonomous vehicle in a limp home mode, wherein the limp home mode limits one or more autonomous driving features.

20. The autonomous driving system of claim 17, wherein the secondary autonomous sensor system is a stand-alone system that is installed upon the autonomous vehicle to restore autonomous driving capability.

\* \* \* \* \*